(No Model.)
J. A. RICHARDSON.
FISH LADDER.
No. 530,655. Patented Dec. 11, 1894.
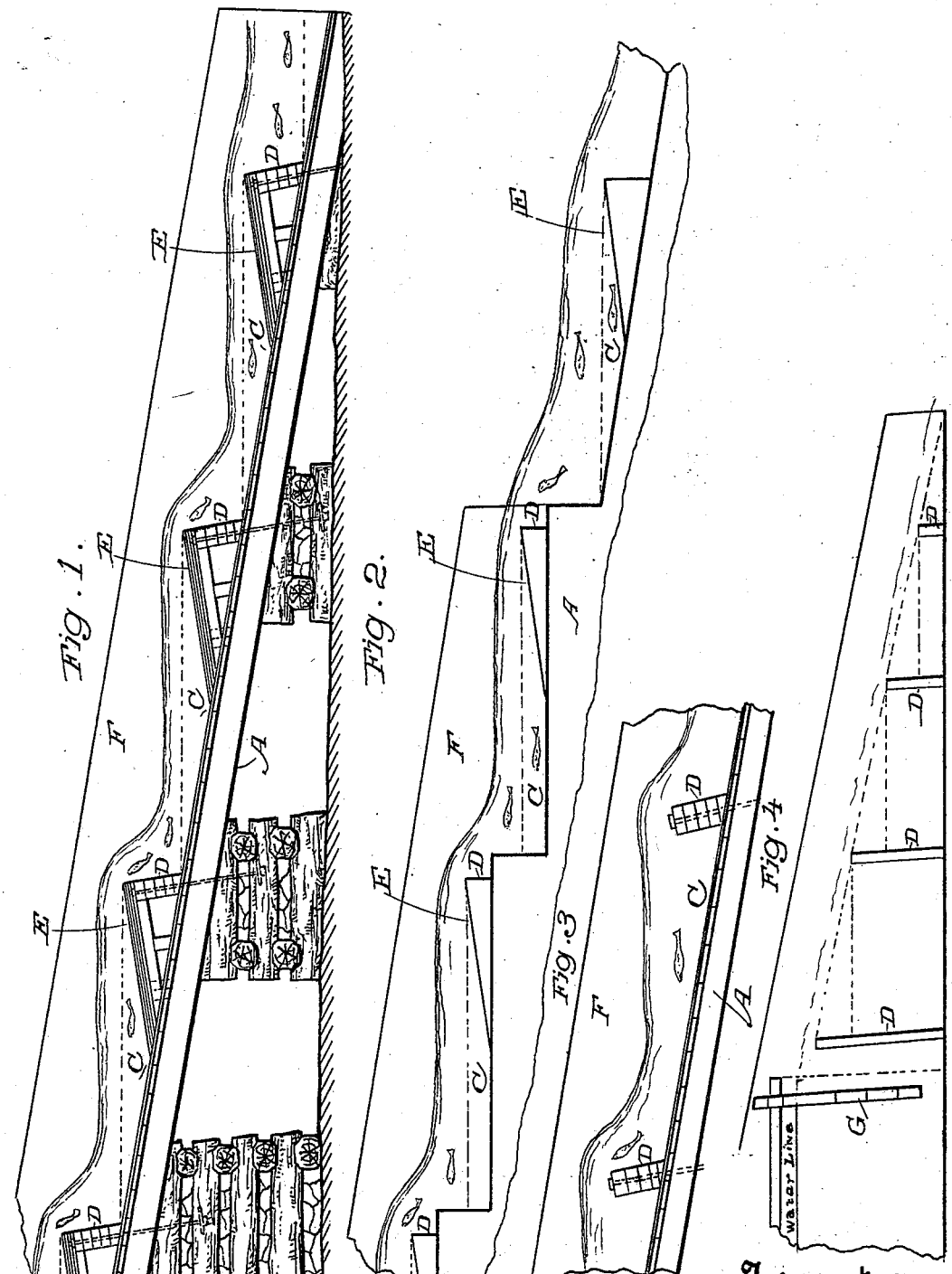

UNITED STATES PATENT OFFICE.

JAMES A. RICHARDSON, OF SAN FRANCISCO, CALIFORNIA.

FISH-LADDER.

SPECIFICATION forming part of Letters Patent No. 530,655, dated December 11, 1894.

Application filed July 21, 1894. Serial No. 518,261. (No model.)

*To all whom it may concern:*

Be it known that I, JAMES A. RICHARDSON, a citizen of the United States, residing in the city and county of San Francisco, State of California, have invented an Improvement in Fish-Ladders; and I hereby declare the following to be a full, clear, and exact description of the same.

My invention relates to improvements in those structures known as "fish-ladders" which are adapted to dams and other obstructions in rivers, so as to allow the fish to pass up over the dam into the water above.

It consists in certain details of construction which will be more fully explained by reference to the accompanying drawings, in which—

Figure 1 is a vertical longitudinal section taken through the ladder, showing one form of the structure. Fig. 2 is a view showing another form of the same. Fig. 3 is a modification. Fig. 4 shows the riffles in an open cut.

The object of the invention is to provide a means for enabling the fish to pass up over dams and other obstructions, to form resting places for them on the way up, and to so construct the device that it is guarded from breakage by timber and drift which may come down the stream during high water.

A is the inclined channel of the fish-way which is constructed of as great width as possible so that the fish will readily find the lower end of it as they come up, the width depending upon the volume of water and size of the stream. This incline may be similar to the apron, so-called, which is often made to extend from the edge of the dam downwardly, or it may be made in a series of approximately horizontal steps or platforms with approximately vertical risers between each, as shown in Fig. 2, the effect being the same, to provide a gradual rise from the bed of the river below to the surface above the dam or obstruction. In either case I make depressions C below the general level of the incline or platforms which will form pockets or wells of water of considerable size and depth within which there will be comparatively still water, while a strong current may be flowing over these pockets. The eddies thus formed in these depressions serve as resting places for the fish after they have surmounted the riffle or obstruction D below, and give them time to gain strength to surmount the next riffle, or to receive them in case of failure and prevent their being carried entirely out of the fish-way. In streams which are not liable to be clogged by drift-wood or badly affected by sudden freshets, these pockets may be made by building up a series of low riffles D (as shown in Fig. 3) transversely extending across the incline or platorm from side to side, the heights to depend on size of stream and volume of water, &c. Side walls F are also built up of timber or other material, and thus inclose the spaces between each of the transverse riffles, and wherever the water is free from driftwood this will be sufficient to form the proper depressed spaces above each of these transverse riffles. The water flowing over these, will first fill these wells, and then will flow in a comparatively smooth current over the successive obstructions or riffles D until it reaches the surface below, and fish attempting to pass up this way will, after surmounting each of the obstructions, fall into the comparatively quiet pool and eddy beneath the next one, where they may remain for as long a time as they wish before attempting the next one.

In cases where the stream is liable to be clogged with drift and material dangerous to the fish-way, and which would be apt to sweep the transverse riffles out in high water, I have constructed inclined aprons E extending from the top of each of the riffles back a short distance toward the foot of the next one. These aprons are so inclined that any heavy timber or other material coming down the stream, and passing down the fish-way, will strike these aprons and will be thus guided over the tops of the riffles and prevented from striking them with force so as to break them down and sweep them out.

In order to make the fish-way available to fish which always come up to the very foot of the dam or obstruction, I remove the lower part of one of the sides, preferably toward the center of the stream, as shown in Fig. 2, so that the water flowing down the fish-way may also flow out over this side, and, if desired, similar riffles and wells or pools may be made upon this side discharge, although this part will be so nearly down to the level of the water below the dam that a simple incline over which the water will flow, will be sufficient, as the current is much less swift where it is diverted from the main direction of flow, and can be easily surmounted by the fish, and after reaching the first pool, they are in position to then pass up the ladder in the usual manner.

In Fig. 4, I have shown the riffles made in an open cut through the dam. In this case the riffles increase in height from the outlet to a level with the top of the dam, and the pools are of increasing depth from the lowermost when the fish enter, to the uppermost which is nearly or quite on a level with the top of the dam. A gate $a$ controls the flow of water through the way, and reduces the current over the uppermost riffle. The fish, after passing over the uppermost riffle, will then pass beneath the gate into the water above the dam.

Having thus described my invention, what I claim as new, and desire to secure by Letters Patent, is—

1. A fish ladder consisting of an inclined imperforate apron extending from the top of the dam to the bed of the stream beneath, and having transverse approximately vertical obstructions at intervals in its surface whereby wells or pools of quiet water will be formed in the spaces beneath the obstructions while the rapid flow of water passes above them.

2. A fish ladder consisting of an inclined imperforate apron formed with offsets extending from the water above the dam or obstruction to that below it, transverse obstructing riffles comprising approximately vertical risers built across the apron whereby wells or pools of comparatively quiet water are formed beneath each riffle, while the main body of water is allowed to flow over said pools without imparting its motion to the water therein.

3. A fish ladder consisting of an inclined imperforate apron, approximately vertical riffles extending across the same so as to provide spaces back of the riffles in which the water collects and backs up to form quiet wells or pools, while the main body of water flows over the top of the riffles, and inclined planes or aprons extending backwardly from the tops of the riffles adapted to protect the latter from driftwood and logs which may pass through the fish-way.

4. A fish ladder consisting of approximately vertical riffles placed at different levels in a channel or water-way, with their upper portions below the surface of the water whereby the spaces between the riffles form wells or pools of quiet water while the more rapid current flows over the top of the riffles, without disturbing the quiet pools.

5. A fish ladder consisting of riffles fixed transversely in a cut or channel in the dam or obstruction with their upper portions at different levels and below the surface of the water whereby wells or pools of quiet water are formed between the riffles while the more rapid current flows over the top of the riffles without disturbing the water of the pools, and a gate above the uppermost riffle.

In witness whereof I have hereunto set my hand.

JAMES A. RICHARDSON.

Witnesses:
S. H. NOURSE,
H. F. ASCHECK.